United States Patent
Sakaguchi et al.

(10) Patent No.: US 11,142,275 B2
(45) Date of Patent: Oct. 12, 2021

(54) SADDLE TYPE VEHICLE

(71) Applicant: KAWASAKI JUKOGYO KABUSHIKI KAISHA, Kobe (JP)

(72) Inventors: Shogo Sakaguchi, Akashi (JP); Motoki Kaji, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 260 days.

(21) Appl. No.: 16/292,796

(22) Filed: Mar. 5, 2019

(65) Prior Publication Data

US 2019/0322329 A1    Oct. 24, 2019

(30) Foreign Application Priority Data

Apr. 18, 2018    (JP) .............................. JP2018-080263

(51) Int. Cl.
| | |
|---|---|
| *B62K 11/04* | (2006.01) |
| *F02B 61/02* | (2006.01) |
| *B60T 8/17* | (2006.01) |
| *F02P 3/02* | (2006.01) |
| *B62J 23/00* | (2006.01) |

(52) U.S. Cl.
CPC ............ *B62K 11/04* (2013.01); *B60T 8/1706* (2013.01); *F02B 61/02* (2013.01); *F02P 3/02* (2013.01); *B62J 23/00* (2013.01)

(58) Field of Classification Search
CPC ........ B62K 11/04; B60T 8/1706; F02B 61/02; F02P 3/02; B62J 23/00
USPC ........................................................ 180/228
See application file for complete search history.

(56) References Cited

U.S. PATENT DOCUMENTS

| | | | |
|---|---|---|---|
| 2005/0081516 A1* | 4/2005 | Inaoka .................... | F01N 13/18 60/324 |
| 2009/0194354 A1* | 8/2009 | Kubo .................... | B62K 11/04 180/312 |
| 2010/0032225 A1* | 2/2010 | Oohashi ................. | B62K 11/04 180/219 |

FOREIGN PATENT DOCUMENTS

| | | | |
|---|---|---|---|
| CN | 202508224 U | * 10/2012 | |
| EP | 3364017 A2 | * 8/2018 | ............. B62M 7/04 |
| JP | 1985-039305 | 11/1985 | |
| JP | H09126109 | 5/1997 | |
| JP | 09254849 | 9/1997 | |
| JP | 09309477 | 12/1997 | |
| JP | 1998-310090 | 11/1998 | |
| JP | 2018134907 A | * 8/2018 | ............. B62K 11/04 |

* cited by examiner

*Primary Examiner* — Minnah L Seoh
*Assistant Examiner* — Sophia Marie McGuire
(74) *Attorney, Agent, or Firm* — Fay Kaplun & Marcin, LLP (57) ABSTRACT

A motorcycle (saddle type vehicle) includes a vehicle body frame, an engine, a bracket and an ignition coil. The engine is mounted to the vehicle body frame. The bracket is mounted to the vehicle body frame. The ignition coil is mounted to the bracket. The bracket includes a frame mounting part, an extension part, and an ignition coil mounting part. The frame mounting part is mounted to the vehicle body frame. The extension part extends away from the frame mounting part toward an outer side in a left-right direction. The ignition coil is mounted to the ignition coil mounting part such that the ignition coil is positioned in the outer side in the left-right direction of the vehicle body frame.

11 Claims, 5 Drawing Sheets

SADDLE TYPE VEHICLE

BACKGROUND INFORMATION

1. Field of the Invention

The present invention relates to a mounting structure of an ignition coil of a saddle type vehicle.

2. Description of the Related Art

Patent Document 1 (Japanese Patent Application Laid-Open No. 1998-310090) discloses a motorcycle comprising a vehicle body frame for supporting an engine and the like. The vehicle body frame includes a pair of tank rails in left and right. In Patent Document 1, the ignition coil is mounted between the pair of tank rails in left and right.

Patent Document 2 (Japanese Examined Utility Model Application Publication No. 1985-039305) discloses a motorcycle comprising a vehicle body frame for supporting an engine and the like. The vehicle body frame includes a backbone provided backward of a head tube, the backbone formed by welding two steel plates which bulge outward in a left-right direction. An electrical component mounting plate is mounted on a right-side surface of the backbone. The electrical component mounting plate is arranged so as to protrude downward from the backbone. An ignition coil is mounted to a lower portion of the electrical component mounting plate.

In Patent Documents 1 and 2, the ignition coil is arranged in the center in the left-right direction. On the other hand, the engine is also arranged in the center in the left-right direction. As a result, the ignition coil is easily affected by heat of the engine. This problem is not limited to a motorcycle but also other saddle type vehicles.

SUMMARY OF THE INVENTION

The present invention relates to a saddle type vehicle with a configuration in which an ignition coil is hardly effected by heat generated in an engine.

According to an aspect of the present invention, a saddle type vehicle with the following configuration is provided. That is, the saddle type vehicle includes a vehicle body frame, an engine, a bracket, and an ignition coil. The engine is mounted to the vehicle body frame. The bracket is mounted to the vehicle body frame. The ignition coil is mounted to the bracket. The bracket includes a frame mounting part, an extension part, and an ignition coil mounting part. The frame mounting part is mounted to the vehicle body frame. The extension part extends toward a direction away from the frame mounting part toward an outer side in the left-right direction. The ignition coil is mounted to the ignition coil mounting part such that the ignition coil is positioned in the outer side in the left-right direction of the vehicle body frame.

Accordingly, the ignition coil is mounted by using the above-described bracket, and thereby the ignition coil can be arranged at a position away from the engine. Therefore, the ignition coil which is easily affected by heat can be arranged at a position far from the engine whose temperature easily becomes high.

According to the present invention, a saddle type vehicle with a configuration in which an ignition coil is hardly affected by heat generated in an engine can be achieved.

DETAILED DESCRIPTION OF THE EMBODIMENTS

An exemplary embodiment of the present invention will be described with reference to drawings. In the following description, front-back and left-right directions are defined that a forwarding direction of a motorcycle (saddle type vehicle) 1 is a front direction. That is, the left-right direction is defined in a direction seen from a driver who got on the motorcycle 1. Therefore, the front-back direction corresponds to a vehicle length direction, and the left-right direction corresponds to the vehicle width direction. A vertical direction is defined as an up-down direction.

Figure 1:
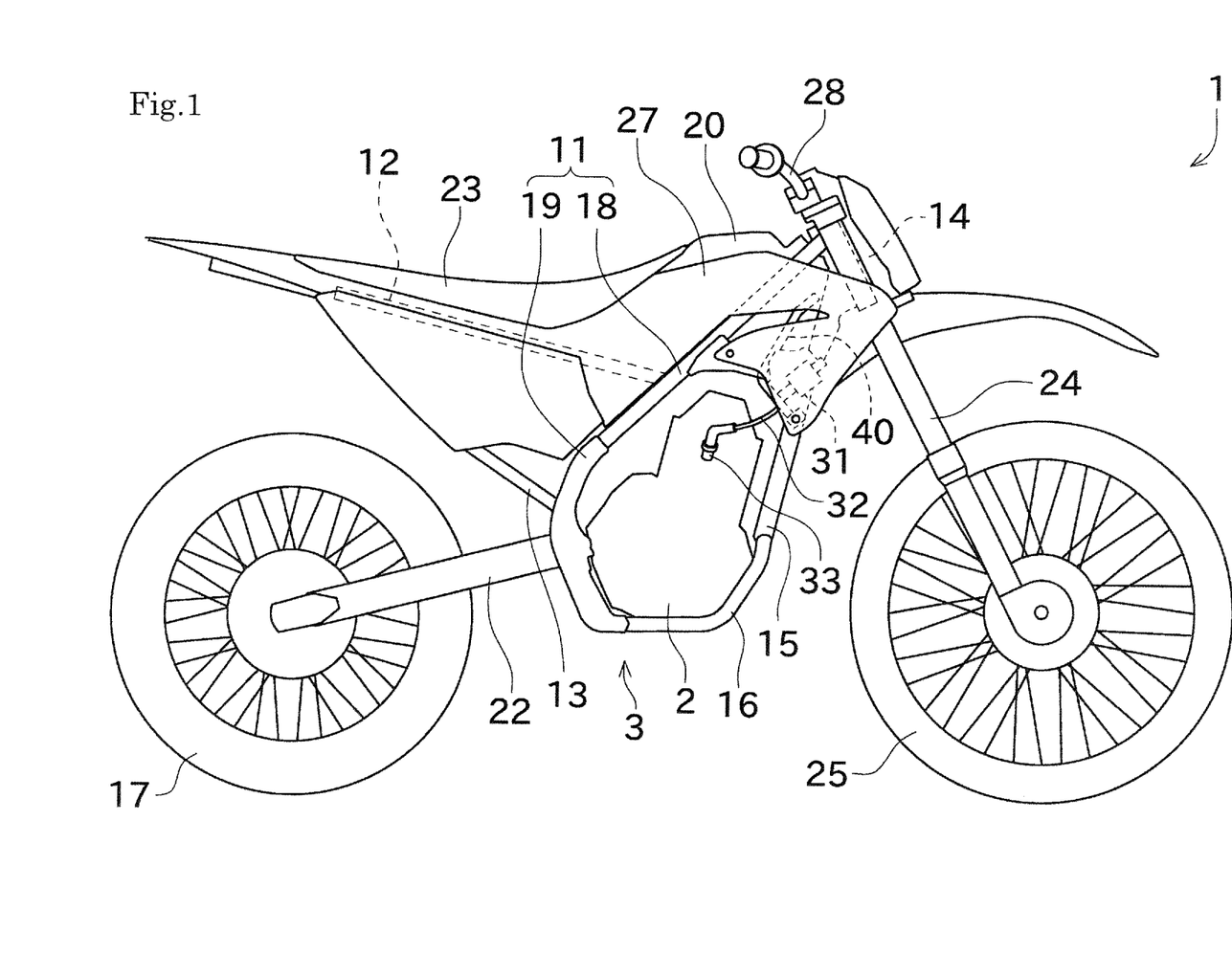
FIG. 1 is a side view showing a motorcycle according to an exemplary embodiment of the present invention.

Firstly, an overall configuration of the motorcycle 1 will be described with reference to FIG. 1. FIG. 1 is a side view showing the motorcycle 1 according to one embodiment of the present invention. The motorcycle 1 is an off-road motorcycle supposed to drive on unpaved road, unleveled sand, etc. As shown in FIG. 1, the motorcycle 1 includes an engine 2 and a vehicle body frame 3.

The engine 2 is configured as a gasoline engine, and functions as a drive source for driving the motorcycle 1. The vehicle body frame 3 supports each of components of the motorcycle 1. The engine 2 includes a cylinder for storing a piston and a crankcase for storing a crankshaft, a transmission gear, and the like. A driving force generated in the engine 2 is shifted by the transmission gear and transmitted to a rear wheel 17 via a drive chain (not shown).

Figure 3:
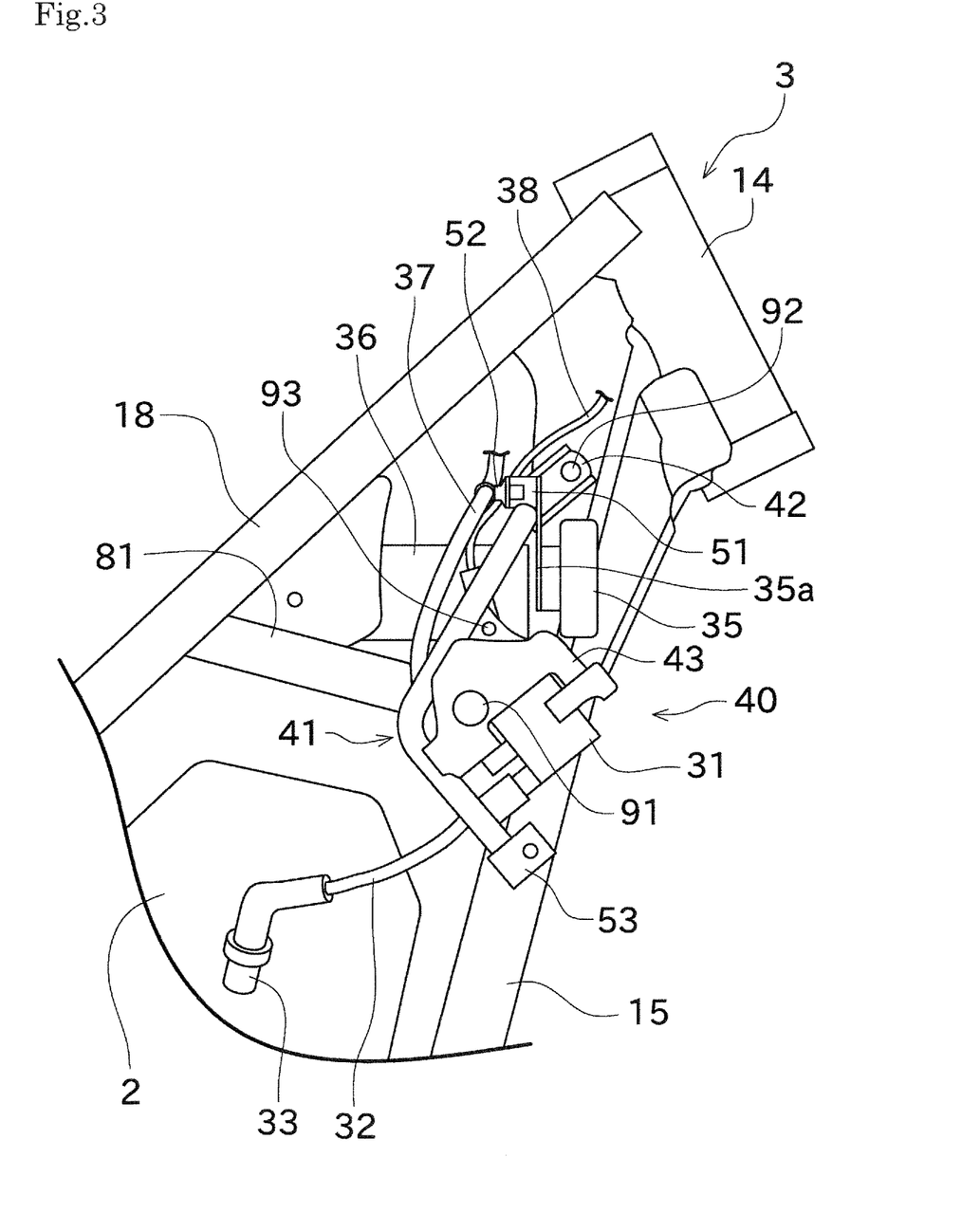
FIG. 3 is a side view showing members which are mounted to the front part of the vehicle body frame.

The vehicle body frame 3 is made of a plurality of metal pipes connected by welding or the like. As shown in FIG. 3, the vehicle body frame 3 includes a first frame 11, a second frame 12, a third frame 13, a head pipe 14, a down frame 15, and a lower frame 16. These frames for constituting the vehicle body frame 3, other than the down frame 15, are arranged in pairs in left and right.

The first frame 11 includes an upper frame 18 and a bottom frame 19. The upper frame 18 is connected to the head pipe 14, and extends rearward and obliquely downward from the head pipe 14. The bottom frame 19 is connected to a lower end side of the upper frame 18, and extends downward from a connecting position between the bottom frame 19 and the upper frame 18.

The upper frame 18 supports a fuel tank 20 and the like arranged in a rear side of the head pipe 14, as shown in FIG. 1. A front end of a swing arm 22 is mounted to the bottom frame 19 so as to be swingable up and down. The rear wheel 17 is rotatably mounted to a rear end of the swing arm 22.

The second frame 12 is connected to a substantially intermediate portion of the upper frame 18, and extends rearward from a connecting position between the second frame 12 and the upper frame 18. A seat 23 on which the driver sits is fixed to the second frame 12. The third frame 13 is connected to the bottom frame 19, and extends rearward and upward from a connection position between the third frame 13 and the bottom frame 19.

The head pipe 14 is arranged in the front end of the vehicle body frame 3. The upper frame 18 is connected to an upper end of the head pipe 14. The down frame 15 is connected to a lower end of the head pipe 14.

The head pipe 14 rotatably supports a front fork 24 shown in FIG. 1 and the like, via an upper bracket and an under bracket (not shown). A front wheel 25 is rotatably mounted to the lower end of the front fork 24. A steering handle 28 for shifting an orientation of the front wheel 25 and steering the vehicle body is mounted to the upper bracket.

The down frame 15 extends rearward and obliquely downward from the head pipe 14. The lower frame 16 includes a portion extending in the up-down direction and a portion extending in the front-back direction. The front end of the lower frame 16 is connected to the lower end of the down frame 15. As described above, one down frame 15 is arranged in the center in the left-right direction. A pair of the lower frames 16 is arranged in left and right. Therefore, at a boundary between the down frame 15 and the lower frame 16, the frame is divided into two branches.

The rear end of the lower frame 16 is connected to the lower end of the bottom frame 19. Accordingly, a space surrounded by the upper frame 18, the bottom frame 19, the down frame 15 and the lower frame 16 is formed. The engine 2 and the like are arranged in a section including this space.

Figure 2:
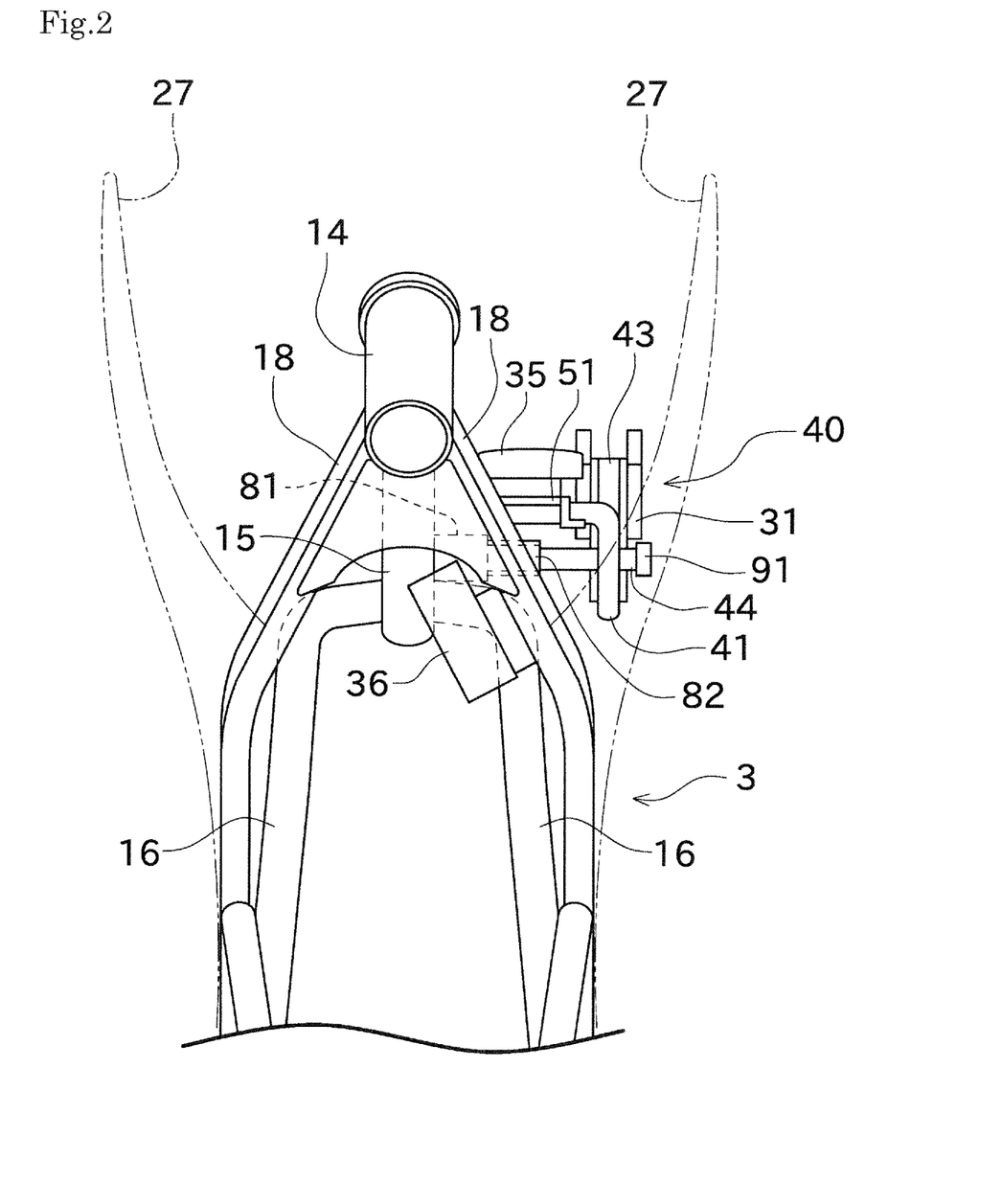
FIG. 2 is a plan view showing members which are mounted to a front part of a vehicle body frame.

A shroud 27 is mounted on a side surface of the vehicle body frame 3. In a side view, the shroud 27 is arranged so as to overlap a part of the upper frame 18 and a part of the down frame 15. In the side view, the shroud 27 is also arranged so as to overlap the fuel tank 20. As shown in FIG. 2, the shroud 27 is a shape approaching the outer side in the left-right direction as approaching forward, that is, a shape with an opened front side. Therefore, running wind can be taken into the shroud 27. The engine 2 is cooled by the running wind that is taken by the shroud 27. In the motorcycle 1 having a radiator, cooling water flowing through the radiator is cooled by the running wind. The shroud 27 also has a function of which the components arranged inside are protected from stone, etc. splashed on the road surface.

Next, members arranged inside the shroud 27 (that is, in a front part of the vehicle body frame 3) will be described with reference to FIG. 2 and FIG. 3. FIG. 2 is a plan view showing members which are mounted to a front part of the vehicle body frame 3. FIG. 3 is a side view showing members which are mounted to the front part of the vehicle body frame 3. A part of the members is omitted in FIG. 2 to FIG. 5.

As shown in FIG. 2 and FIG. 3, an ignition coil 31, a horn 35, an ABS unit 36, cables 37, 38 and a bracket 40 are arranged inside the shroud 27.

The ignition coil 31 is supported by the vehicle body frame 3 via the bracket 40. The voltage is supplied to the ignition coil 31 from a battery. The ignition coil 31 generates a high voltage for causing discharge in a spark plug of the engine 2, by boosting the voltage supplied from the battery. The high voltage generated by the ignition coil 31 is applied to the spark plug that is arranged below a plug cap 33, via a plug cord 32.

In this embodiment, the motorcycle 1 has one ignition coil 31 and one spark plug. The ignition coil 31 and the spark plug are arranged on the same side in the left-right direction. In this embodiment, the ignition coil 31 and the spark plug are arranged on the right side, but they may be arranged on the left side. When the plurality of ignition coils 31 and the spark plugs are arranged, they may be arranged on the left side and right side separately.

The horn 35 is supported by the vehicle body frame 3 via the bracket 40. The horn 35 makes horn sound depending on the driver's instructions, by using the voltage supplied from the battery.

The ABS unit 36 is mounted to the vehicle body frame 3, and thereby supported by the vehicle body frame 3. In the side view, the ABS unit 36 is arranged between the down frame 15 and the upper frame 18. The ABS unit 36 prevents locking of the front wheel 25 and the rear wheel 17 during brake actuation. The ABS unit 36 has a control board, a hydraulic apparatus, and a casing for storing the control board and the hydraulic apparatus. The control board estimates a situation of slipping of wheels, based on the information inputted from a wheel sensor, etc. The control board pressurizes or decompresses brake oil by operating the hydraulic apparatus in accordance with the situation of slipping of the wheels. Thereby, the motorcycle 1 is braked while preventing locking of the front wheel 25 and the rear wheel 17.

The cables 37, 38 are mounted to the bracket 40. The cables 37, 38 are, for example, a power cable for applying the voltage (supplying electric power) to the ignition coil 31, a signal cable for transmitting a detection result signal of the wheel sensor, or a power cable for transmitting a force applied to a clutch lever, etc.

Figure 4:
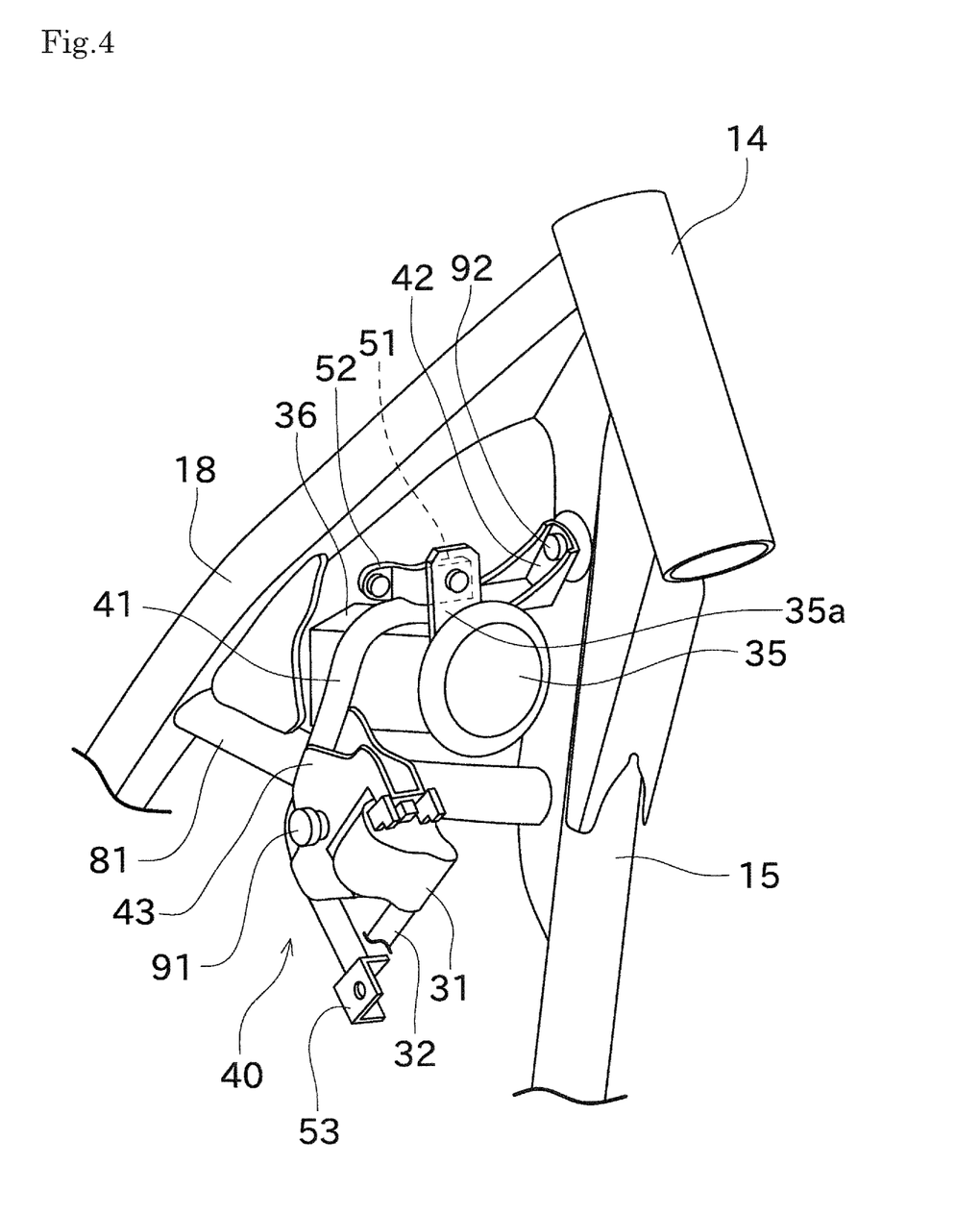
FIG. 4 is a perspective view showing members which are mounted to the front part of the vehicle body frame.
Figure 5:
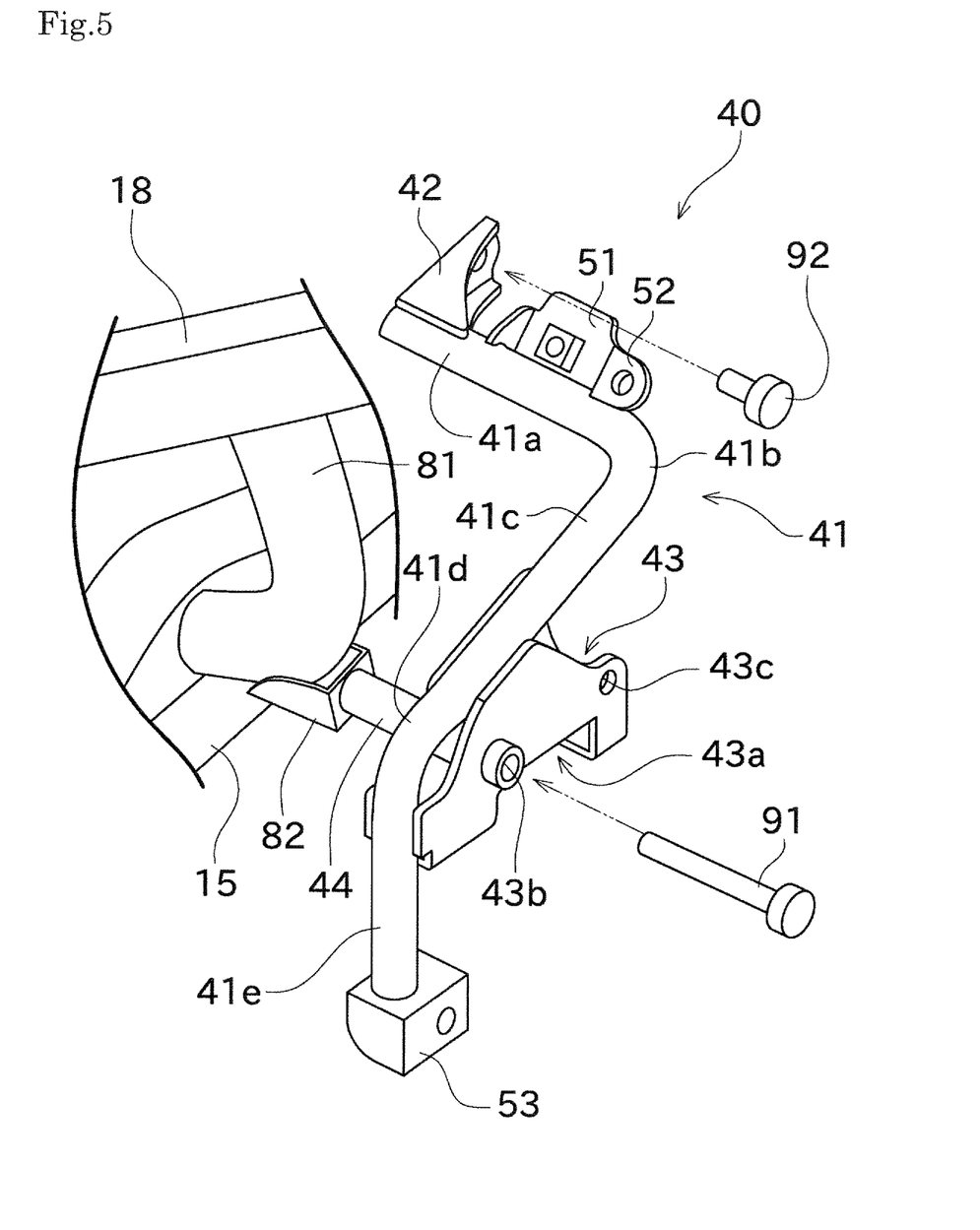
FIG. 5 is a perspective view showing a configuration and a mounting method of a bracket.

Next, the bracket 40 will be described with further reference to FIG. 4 and FIG. 5. FIG. 4 is a perspective view showing members which are mounted to the front part of the vehicle body frame 3. FIG. 5 is a perspective view showing a configuration and a mounting method of the bracket 40.

The bracket 40 is mounted to the vehicle body frame 3. In addition, the ignition coil 31 can be mounted to the bracket 40. As shown in FIG. 2 and the like, the bracket 40 is a member for arranging the ignition coil 31 at a position away from the vehicle body frame 3 toward the outer side in the left-right direction.

As shown in FIG. 5, the bracket 40 has a rod-like body 41, a frame mounting part 42, an ignition coil mounting part 43, a cylindrical body 44, a horn mounting part 51, a cable mounting part 52, and a shroud mounting part 53.

The rod-like body 41 is an elongated member made of metal, with a circular cross-sectional outline. The rod-like body 41 has a three-dimensional shape by forming a plurality of bends. The members are mounted to the rod-like body 41 at various positions by welding. Since the rod-like body 41 has the circular cross-sectional outline, such bending work and welding work can be easily performed. However, the rod-like body 41 may have a polygonal cross section, for example.

As shown in FIG. 5, the rod-like body 41 has an extension part 41*a*, a first bending part 41*b*, a first fixing part 41*c*, a second bending part 41*d*, and a second fixing part 41*e*.

The frame mounting part 42 is connected to an end portion of the extension part 41*a* by welding. The frame mounting part 42 has a through hole. The down frame 15 has a screw groove. As shown in FIG. 4, a second connecting bolt 92 is inserted into the frame mounting part 42 and fastened thereto. Thereby, the rod-like body 41 is mounted to the down frame 15.

A longitudinal direction of the extension part 41*a* includes components in the outer side in the left-right direction. Therefore, the extension part 41*a* is formed so as to extend outward in the left-right direction from a portion to which the frame mounting part 42 is connected (that is, from a portion mounted to the vehicle body frame 3). Accordingly, a large part of the bracket 40 (in particular, the ignition coil mounting part 43) can be separated from the vehicle body frame 3 to the outer side in the left-right direction.

Although the frame mounting part 42 is mounted to the down frame 15 in this embodiment, the frame mounting part 42 may be mounted to the head pipe 14, the lower frame 16, or the upper frame 18, etc. Alternatively, the frame mounting part 42 may be mounted to a connecting frame 81 which connects the down frame 15 and the upper frame 18.

As shown in FIG. 4 and FIG. 5, the horn mounting part 51 and the cable mounting part 52 are mounted to the extension part 41*a* by welding. The horn mounting part 51 and the cable mounting part 52 are formed by bending one flat plate and forming a hole or a screw groove. Therefore, the horn mounting part 51 and the cable mounting part 52 are integrally formed therewith.

A nut is welded to the horn mounting part 51, and thereby the screw groove is formed. A mounting plate 35*a* which is mounted to the horn 35 and extends upward is mounted to a rear portion of the horn 35. The mounting plate 35*a* is fixed to the horn mounting plate 51 by the bolt. Although the horn 35 is mounted to the bracket 40 in this embodiment, other electrical components (for example, a control unit or a communication unit), etc. may be mounted to the bracket 40.

The cable mounting part 52 has a through hole. A binding tool or the like is mounted to the through hole, as shown in FIG. 3. In this configuration, the cable 37 is mounted to the cable mounting part 52. The cable mounted to the cable mounting part 52 may be a cable that is connected to the members mounted to the bracket 40 or the members arranged near the bracket 40 (ABS unit 36, etc.), or may be other cables.

The first bending part 41*b* connects the extension part 41*a* and the first fixing part 41*c*, and changes its orientation in the longitudinal direction. The longitudinal direction of the first fixing part 41*c* is a direction inclined so as to approach downward as approaching to the rear side. In other words, the longitudinal direction of the first fixing part 41*c* is same as the longitudinal direction of the upper frame 18 or the down frame 15. The first fixing part 41*c* is positioned below the upper frame 18 and above the down frame 15, in the side view (FIG. 1).

The ignition coil mounting part 43 is connected to the first bending part 41*b* by welding. As shown in FIG. 5, the ignition coil mounting part 43 is substantially U-shaped (in horizontal U-shaped). The ignition coil mounting part 43 has two opposing plates which face each other and a connecting plate for connecting each part of one end (lower end) of the two opposing plates. Each of the opposing plates is welded to both the first fixing part 41*c* and the second fixing part 41*e*.

As shown in FIG. 5, the ignition coil mounting part 43 has a mounting space 43*a*, a bolt insertion hole 43*b*, and a cable fixing hole 43*c*. The mounting space 43*a* is a space that is formed by a cutout and the like formed in the opposing plates. The ignition coil 31 is partly arranged on this space, as shown in FIG. 4 and the like. The ignition coil 31 is mounted by the bolt using the screw groove (welded nut), etc. formed on the connecting plate.

Accordingly, as shown in FIG. 2 and FIG. 4, the ignition coil 31 can be arranged on the outer side in the left-right direction of the down frame 15, as the mounting portion of the bracket 40. Furthermore, the ignition coil 31 can be arranged on the outer side in the left-right direction of the entire vehicle body frame 3. Accordingly, since the ignition coil 31 can be arranged at a position away from the engine 2, the ignition coil 31 is hardly affected by heat of the engine 2. In particular, since running wind is taken into the shroud 27, there is a possibility that the ignition coil 31 can be cooled by this running wind. Since the ignition coil 31 is arranged forward of the engine 2, the heat of the engine 2 is hardly transmitted to the ignition coil 31 due to an influence of the running wind flowing rearward.

Furthermore, the ignition coil 31 is arranged on the outer side in the left-right direction, which can form a space between the vehicle body frame 3 and the bracket 40. In this embodiment, the ABS unit 36 is arranged by utilizing this space. As shown in FIG. 3 and the like, in the side view, the bracket 40 overlaps the ABS unit 36. Specifically, the ABS unit 36 is arranged on the right side from the center in the left-right direction. The bracket 40 is also arranged on the further right side from the ABS unit 36. In this configuration, the ABS unit 36 can be protected when the motorcycle 1 falls, for example.

The ignition coil mounting part 43 is not limited to a substantially L-shaped member. For example, one flat plate member may be acceptable. The ignition coil 31 is mounted to a lower part of the ignition coil mounting part 43, but this is not limited. The ignition coil 31 may be mounted to any position or may be mounted by using any method depending on a shape of the ignition coil mounting part 43.

As shown in FIG. 5, a bolt insertion hole 43*b* can receive a first connecting bolt (connecting portion) 91 for fixing the ignition coil mounting part 43 to the vehicle body frame 3. Each of the two opposing plates of the ignition coil mounting part 43 has a through hole with its diameter that is larger than the bolt insertion hole 43*b*. The cylindrical body 44 is inserted into and welded to the through hole. Such through hole formed in the cylindrical body 44 is the bolt insertion hole 43*b*. The cylindrical body 44 is arranged so as to vertically penetrate the opposing plates. The cylindrical body 44 is formed so as to extend from the ignition coil mounting part 43 toward the inside in the left-right direction, and the end of the cylindrical body 44 comes in contact with a protrusion 82.

The protrusion 82 is a part of the vehicle body frame 3. Specifically, the protrusion 82 is welded to the connecting frame 81. The protrusion 82 has a screw groove. The first connecting bolt 91 is fastened to the screw groove, and thereby the ignition coil mounting part 43 is fixed to the vehicle body frame 3. That is, the bracket 40 in this embodiment is fixed to the vehicle body frame 3, at two positions, the frame mounting part 42 and the cylindrical body 44.

As such, the bracket 40 is removably mounted to the vehicle body frame 3. Therefore, for example, the bracket 40 is removed at a time of replacing other members, which can improve workability. In a fall of the motorcycle 1, if the bracket 40 is damaged but the vehicle body frame 3 is not damaged, repair is completed merely by replacing only the bracket 40. On the other hand, if the bracket 40 is welded to the vehicle body frame 3, there is a possibility that the entire vehicle body frame 3 must be replaced when the bracket 40 is damaged.

Here, if the bracket 40 is fixed to the vehicle body frame 3 only by the frame mounting part 42, the bracket 40 is vibrated with the frame mounting part 42 as a base point in vibration of the vehicle body frame 3. Therefore, the ignition coil mounting part 43 that is away from the frame mounting part 42 is vibrated more largely than the frame mounting part 42. As a result, the ignition coil 31 having weakness for vibration receives large vibration. Even if the frame mounting part 42 as one end of the rod-like body 41 and the other end of the rod-like body 41 are fixed to the vehicle body frame 3, the ignition coil mounting part 43 vibrates to some extent at the above-described fixed two points as the base point. In this respect, as in this embodiment, the ignition coil mounting part 43 is fixed to the vehicle body frame 3 and thereby vibration of the ignition coil mounting part 43 can be greatly reduced. As a result, the ignition coil 31 does not receive large vibration. Therefore, vibration can be sufficiently suppressed without arranging a vibration isolating member between the vehicle body frame 3 and the ignition coil 31, for example.

Although the ignition coil mounting part 43 is fixed to the protrusion 82 that is connected to the connecting frame 81, the ignition coil mounting part 43 may be fixed to the head pipe 14, the down frame 15, the lower frame 16, or the upper frame 18, etc., or may be fixed to the member that is mounted to these frames. The cylindrical body 44 and the vehicle body frame 3 may be mounted by welding, instead of the bolt. The bracket 40 may be mounted to the vehicle body frame 3 at one portion or at a plurality of portions different from the ignition coil mounting part 43.

As shown in FIG. 3, a cable fixing hole 43c is used to insert a cable fixing pin 93 for fixing a connector or a protector mounted to the cable 38.

As shown in FIG. 5, the second bending part 41d connects the first fixing part 41c and the second fixing part 41e, and changes its longitudinal direction. The longitudinal direction of the second fixing part 41e is a direction inclined so as to approach downward as approaching forward. In other words, the second fixing part 41e extends in a direction approaching the down frame 15. Accordingly, the rod-like body 41 is substantially L-shaped in the plan view as shown in FIG. 2, and substantially L-shaped even in the side view as shown in FIG. 3.

The two opposing plates of the ignition coil mounting part 43 are connected to the second fixing part 41e by welding, as described above. Accordingly, since a weld length of the ignition coil mounting part 43 can be increased, the ignition coil mounting part 43 can be firmly fixed.

A shroud mounting part 53 is connected to a lower end (front end) of the second fixing part 41e by welding. The shroud mounting part 53 has a hole for fitting a projection of the shroud 27.

As such, the bracket 40 in this embodiment has a function of mounting the horn 35, the cables 37, 38, and the shroud 27, in addition to the function of mounting the ignition coil 31. This can reduce the number of parts of the motorcycle 1.

A large amount of parts are connected to the vehicle body frame 3. In addition, the vehicle body frame 3 has specifications required according to each of parts. Therefore, if the ignition coil 31 is mounted to the vehicle body frame 3, the ignition coil 31 is less likely to be freely arranged. However, as in this embodiment, the ignition coil 31 is mounted via the bracket 40, which can arrange the ignition coil 31 with high degree of freedom.

Therefore, in this embodiment, the ignition coil 31 can be arranged in consideration of the length and the orientation of the plug cord 32 while effectively utilizing an internal space of the shroud 27. Specifically, since high voltage is applied to the plug cord 32, electromagnetic noise is generated around the plug cord 32. In addition, since the plug cord 32 can be resistant to high voltage, cost per length is high. Therefore, it is preferable that the plug cord 32 is short. Since the plug cord 32 has a large cross sectional area so as to be resistant to high voltage, it is difficult to bend steeply. Therefore, it is preferable to arrange the plug cord 32 without bending steeply.

In consideration of the above, in this embodiment, as shown in FIG. 3, in the side view, the ignition coil mounting part 43 is arranged in a position closer to the plug cap 33 than the frame mounting part 42. Specifically, in the side view, the plug cap 33 is arranged rearward and obliquely downward of the frame mounting part 42, and also the ignition coil mounting part 43 is arranged rearward and obliquely downward of the frame mounting part 42. In this configuration, the length of the plug cord 32 can be shortened.

Furthermore, in this embodiment, a surface on the ignition coil 31 to which the plug cord 32 is mounted, is arranged so as to face the plug cap 33. Specifically, in the side view, such mounting surface on the ignition coil 31 faces rearward and obliquely downward, and the plug cap 33 is arranged rearward and obliquely downward of the ignition coil 31. In other words, in the side view, the plug cap 33 is arranged on an extended line in the axial direction of the ignition coil 31 (the axial direction of the connector for mounting the plug cord 32). Therefore, the ignition coil 31 and the spark plug can be connected to each other without bending the plug cord 32 too much.

As described above, the motorcycle 1 in the above-described embodiment includes the vehicle body frame 3, the engine 2, the bracket 40, and the ignition coil 31. The engine 2 is mounted to the vehicle body frame 3. The bracket 40 is mounted to the vehicle body frame 3. The ignition coil 31 is mounted to the bracket 40. The bracket 40 includes the frame mounting part 42, the extension part 41a, and the ignition coil mounting part 43. The frame mounting part 42 is mounted to the vehicle body frame 3. The extension part 41a extends away from the frame mounting part 42 toward the outer side in the left-right direction. The ignition coil 31 is mounted to the ignition coil mounting part 43 such that the ignition coil 31 is positioned on the outer side in the left-right direction of the vehicle body frame 3.

Accordingly, the ignition coil 31 is mounted by using the bracket 40, and thereby the ignition coil 31 can be arranged at a position away from the engine 2. Therefore, the ignition coil 31 easily affected by heat can be arranged at a position away from the engine 2 whose temperature easily becomes high.

The motorcycle 1 of the above-described embodiment includes a connecting portion (first connecting bolt 91) for connecting the ignition coil mounting part 43 and the vehicle body frame 3.

Accordingly, the vibration of the ignition coil mounting part 43 is reduced, which can reduce the vibration received by the ignition coil 31.

In the motorcycle 1 of the above-described embodiment, the connecting portion is the first connecting bolt 91. The ignition coil mounting part 43 has the bolt insertion hole 43b for receiving the first connecting bolt 91. The ignition coil mounting part 43 is fixed to the vehicle body frame 3 by the first connecting bolt 91 that is inserted in the bolt insertion hole 43b.

Accordingly, the ignition coil mounting part 43 and the vehicle body frame 3 are connected to each other by the first connecting bolt 91. Thereby, when the motorcycle 1 falls and the bracket 40 is damaged, there is a possibility that the bracket 40 is merely replaced without replacing the vehicle body frame 3.

In the motorcycle 1 of the above-described embodiment, the cylindrical body 44 having the bolt insertion hole 43b is welded to the ignition coil mounting part 43. The cylindrical body 44 comes in contact with the vehicle body frame 3.

Accordingly, the vibration received by the ignition coil 31 can be reduced with a simple configuration.

The motorcycle 1 of the above-described embodiment includes the ABS unit 36 that is arranged on a first side (the right side in the above-described embodiment) from the center in the left-right direction of the vehicle body frame 3. The bracket 40 overlaps at least a part of the ABS unit 36 in the side view. The bracket 40 is also arranged on the first side of the vehicle body frame 3.

Accordingly, the ABS unit 36 can be protected by the bracket 40. The ABS unit 36 can be arranged on an available space formed by mounting the ignition coil 31 via the bracket 40.

The motorcycle 1 in the above-described embodiment is arranged on the outer side in the left-right direction of the vehicle body frame 3, and includes the shroud 27 for guiding wind. The ignition coil 31 is arranged between the vehicle body frame 3 and the shroud 27.

Accordingly, the ignition coil 31 is covered with the shroud 27, which can protect the ignition coil 31 from stones and the like scattered from the road surface.

In the motorcycle 1 of the above-described embodiment, the bracket 40 includes the shroud mounting part 53 to which the shroud 27 is mounted.

Accordingly, the number of parts can be reduced as compared with a configuration having a separate component for connecting the vehicle body frame 3 and the shroud 27.

In the motorcycle 1 of the above-described embodiment, the bracket 40 includes the rod-like body 41. The rod-like body 41 includes the extension part 41a, fixing parts (the first fixing part 41c, the second fixing part 41e), and a bending part (the first bending part 41b). The extension part 41a extends outward in the left-right direction. The fixing parts extend in a direction different from the extension part 41a. The ignition coil mounting part 43 is fixed to the fixing parts. The bending part connects the extension part 41a and the fixing parts.

Accordingly, a member including the extension part 41a and a portion for fixing the ignition coil mounting part 43 can be created merely by bending one rod-like body 41.

Although a preferred embodiment of the present invention has been described above, the above-described configuration can be modified, for example, as follows.

The shape of the bracket 40 in the above-described embodiment is an example, and may be different from the above-described shape. The bracket 40 may be formed by bending and cutting out a flat plate, for example, instead of the rod-like body 41. In the bracket 40, at least one of the horn mounting part 51 to the shroud mounting part 53 may be omitted. The parts other than the horn mounting part 51 to the shroud mounting part 53 may be also mounted.

Although the above-described embodiment shows an example in which the present invention applies to the off-road type motorcycle, the present invention can apply to other motorcycles (a naked type, a super sports type, a cruise type, a tourer type, or a scooter type, etc.). The present invention can also apply to the saddle type vehicles other than the motorcycle (vehicles straddled by the driver). Other saddle type vehicles include three-wheeled or four-wheeled all-terrain vehicles (ATV, All Terrain Vehicle) for mainly running on non-paved road and water bikes (personal watercraft).

What is claimed is:

1. A saddle type vehicle comprising:
    a vehicle body frame;
    an engine mounted to the vehicle body frame;
    a bracket mounted to the vehicle body frame;
    an ignition coil mounted to the bracket,
    wherein the bracket includes a frame mounting part that is mounted to the vehicle body frame, an extension part which extends away from the frame mounting part toward an outer side in a left-right direction, and an ignition coil mounting part to which the ignition coil is mounted such that the ignition coil is positioned in the outer side in the left-right direction of the vehicle body frame; and
    a connecting portion connecting the ignition coil mounting part and the vehicle body frame,
    wherein the connecting portion is a bolt, wherein the ignition coil mounting part has a bolt insertion hole for receiving the bolt, and wherein the ignition coil mounting part is fixed to the vehicle body frame by the bolt that is inserted in the bolt insertion hole.

2. The saddle type vehicle according to claim 1, wherein a cylindrical body having the bolt insertion hole is welded to the ignition coil mounting part, and wherein the cylindrical body comes in contact with the vehicle body frame.

3. The saddle type vehicle according to claim 1, further comprising:
    an ABS unit arranged on a first side in the left-right direction from a center in the left-right direction of the vehicle body frame,
    wherein the bracket overlaps at least a part of the ABS unit in a side view, and wherein the bracket is arranged on the first side of the vehicle body frame.

4. The saddle type vehicle according to claim 1, further comprising:
    a shroud arranged on the outer side in the left-right direction of the vehicle body frame and guides wind,
    wherein the ignition coil is arranged between the vehicle body frame and the shroud.

5. The saddle type vehicle according to claim 4, wherein the bracket includes a shroud mounting part to which the shroud is mounted.

6. The saddle type vehicle according to claim 3, wherein the ABS unit is arranged between the vehicle body frame and the bracket.

7. The saddle type vehicle according to claim 1, wherein the ignition coil mounting part has a plate shape member.

8. The saddle type vehicle according to claim 7, wherein the plate shape member includes two opposing plates and a connecting plate.

9. The saddle type vehicle according to claim 1, wherein the ignition coil mounting part has a plate shape member, the ignition coil mounting part being attached to the vehicle body frame via rod shape members.

10. A saddle type vehicle comprising:
    a vehicle body frame;
    an engine mounted to the vehicle body frame;
    a bracket mounted to the vehicle body frame; and
    an ignition coil mounted to the bracket,
    wherein the bracket includes a frame mounting part that is mounted to the vehicle body frame, an extension part which extends away from the frame mounting part toward an outer side in a left-right direction, and an ignition coil mounting part to which the ignition coil is mounted such that the ignition coil is positioned in the outer side in the left-right direction of the vehicle body frame, and
    wherein the bracket includes a rod-shaped body, wherein the rod-shaped body includes: the extension part; a fixing part which extends in a direction different from the extension part, the ignition coil mounting part being fixed to the fixing part; and a bending part which connects the extension part and the fixing part.

11. A saddle type vehicle comprising:
a vehicle body frame;
an engine mounted to the vehicle body frame;
a bracket mounted to the vehicle body frame;
an ignition coil mounted to the bracket,
wherein the bracket includes a frame mounting part that is mounted to the vehicle body frame, an extension part which extends away from the frame mounting part toward an outer side in a left-right direction, and an ignition coil mounting part to which the ignition coil is mounted such that the ignition coil is positioned in the outer side in the left-right direction of the vehicle body frame; and
an ABS unit arranged on a first side in the left-right direction from a center in the left-right direction of the vehicle body frame,
wherein the ABS unit is arranged between the vehicle body frame and the bracket,
wherein the bracket overlaps at least a part of the ABS unit in a side view, and
wherein the bracket is arranged on the first side of the vehicle body frame.

\* \* \* \* \*